United States Patent [19]

Baessler

[11] Patent Number: 5,647,627
[45] Date of Patent: Jul. 15, 1997

[54] PIPE PULLER

[76] Inventor: David J. Baessler, 1074 S. I-76 Frontage Rd., Wiggins, Colo. 80654

[21] Appl. No.: 555,619

[22] Filed: Nov. 9, 1995

[51] Int. Cl.⁶ .................................................. B66C 1/56
[52] U.S. Cl. ........................................................ 294/96
[58] Field of Search ................... 294/93–97, 86.12, 294/86.24, 86.25, 102.1, 89; 285/258

[56] References Cited

U.S. PATENT DOCUMENTS

| | | | |
|---|---|---|---|
| 1,474,886 | 11/1923 | Boyce | 294/86.25 |
| 2,687,324 | 8/1954 | Grunsky et al. | 294/96 |
| 3,709,546 | 1/1973 | Vaughan | 294/96 |
| 3,915,489 | 10/1975 | Murphy | 294/96 |
| 4,746,158 | 5/1988 | Fields | 294/94 |
| 5,094,496 | 3/1992 | King, Sr. | 294/96 |
| 5,439,264 | 8/1995 | Margiottiello | 294/94 |

FOREIGN PATENT DOCUMENTS 495040  8/1950  France ..................... 294/96

OTHER PUBLICATIONS

Ditch Witch, 255SX Vibratory Plow, Feb., 1995.
Condux International Inc., Pulling Eye, 1995.

*Primary Examiner*—Dean Kramer
*Attorney, Agent, or Firm*—Rick Martin

[57] ABSTRACT

The present invention relates to a pipe puller which grips the inner bore of the pipe to be installed. A tapered, threaded, expandable gripping member is inserted into the bore of the pipe. The gripping member is turned clockwise which then expands the gripping member so that the gripping member is placed in contact with the inner surface of the pipe. A hollow cylinder is also placed over the pipe and gripping member to protect the end of the pipe as it is pulled through the ground. The pipe puller is pulled through the ground by a motive device attached to the end of the pipe puller shaft.

11 Claims, 3 Drawing Sheets

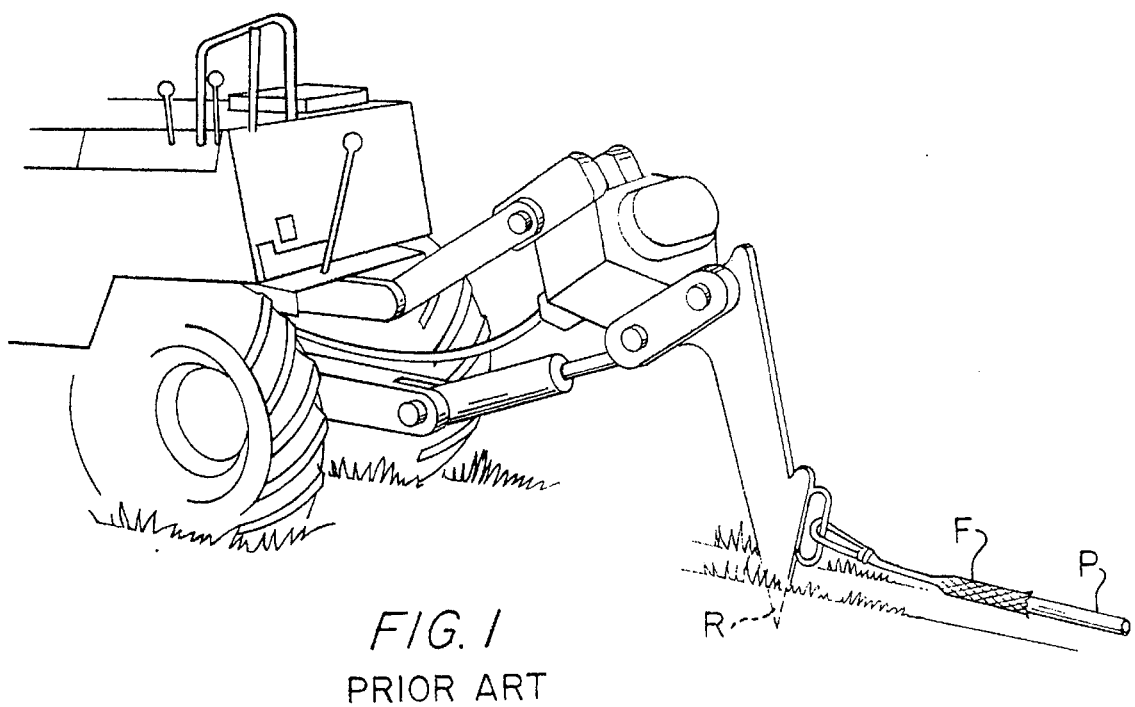
FIG. 1
PRIOR ART
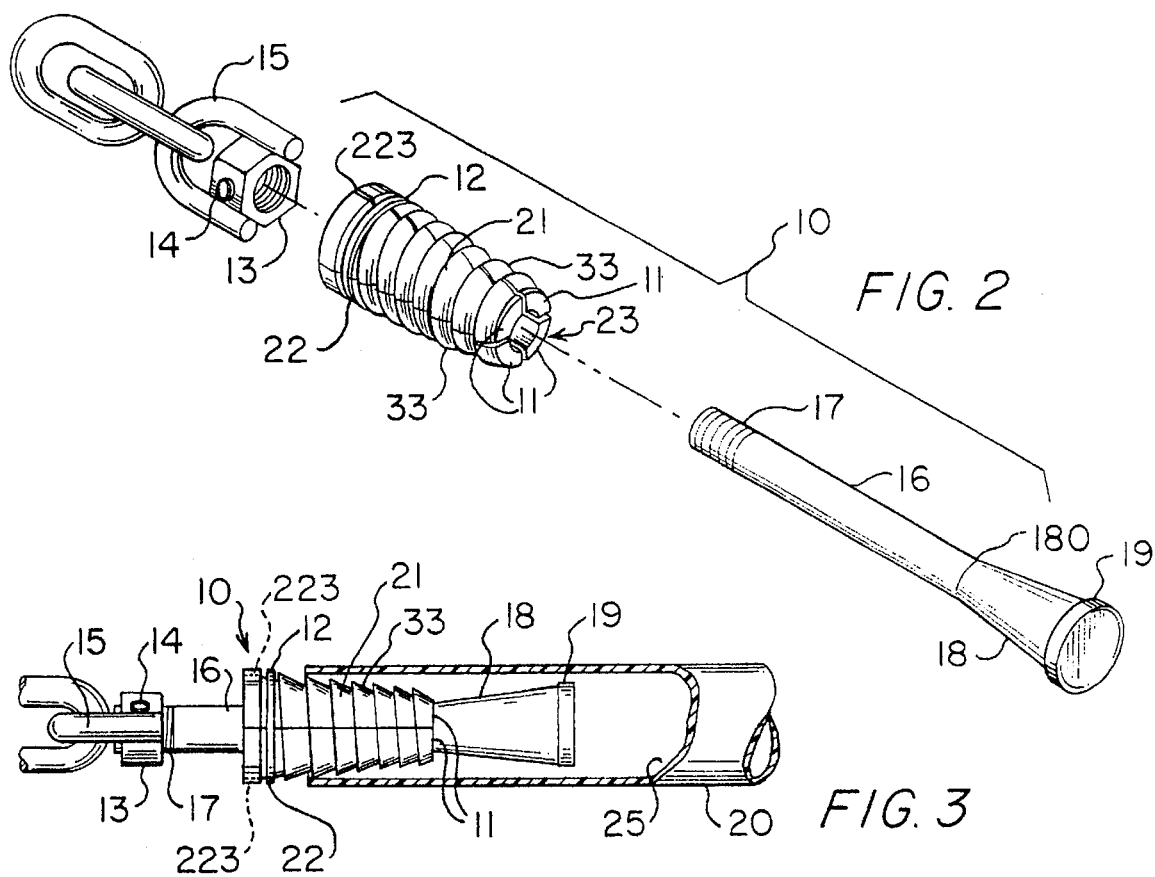
FIG. 2
FIG. 3

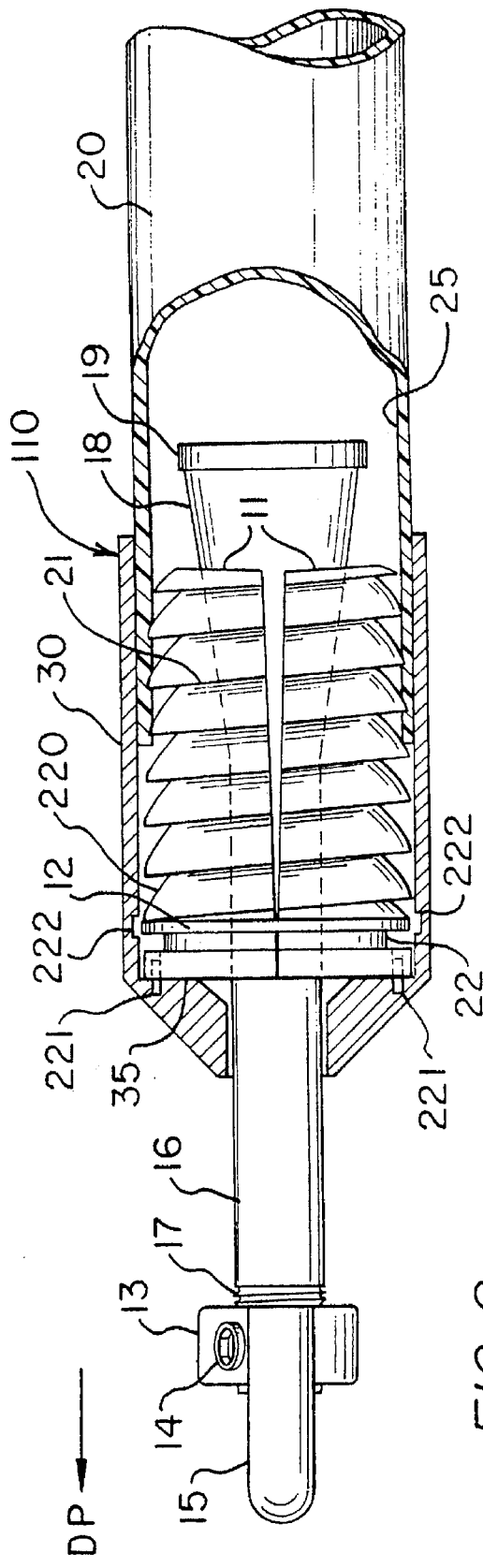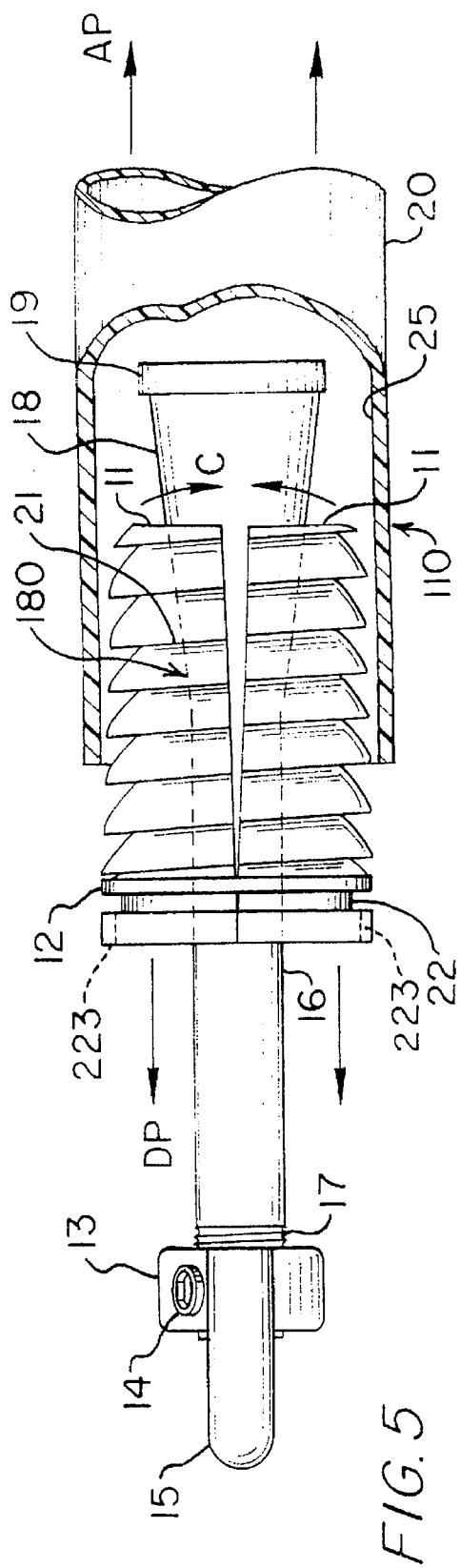

PIPE PULLER

FIELD OF INVENTION

The present invention relates to a pipe puller which is locked on the pipe having expandable tapered gripping members with spiral ridges to allow the puller to grip the inner bore of an underground pipe.

BACKGROUND OF THE INVENTION

The installation of pipe in underground service is accomplished by various methods. These methods include digging a trench mechanically or manually digging using a shovel. After a trench is dug, the pipe is usually pulled underground by means of a chinese finger. A chinese finger is a hollow wire mesh tube which encircles and grips the outside of the pipe. One end of the chinese finger is then attached to a motive device or pulling vehicle. The attachment on the motive device or pulling vehicle usually includes a shank or ripper which precedes the chinese finger in the earth. See FIG. 1, (Prior Art). The ripper R opens a trench in the earth within which the chinese finger F pulls the pipe P. Once installation is completed the chinese finger F is then removed from the end of the pipe P.

Removal of the chinese finger from the pipe is difficult since the pipe is usually in the trench covered with earth. The chinese finger must be forcibly compressed to cause it to loosen its grip on the pipe. This manual maneuver is difficult when the mesh is compacted with soil. Further, the end of the pipe may be damaged during pulling. Finally, the nature of the chinese finger requires the tool to be under tension to perform as desired. The chinese finger cannot be used to "back" pipe into tight areas where the motive device cannot be operated.

There remains a need for a pipe puller which (1) allows the puller to be quickly and non-destructively detached from the pipe after pulling; (2) protects the end of the pipe during the underground pulling operation; (3) allows the pipe to be pushed as well as pulled so as to allow installation in areas where the motive device cannot physically go, such as against a wall; (4) allows the pipe to be pulled without damaging the pipe; (5) facilitates compaction of the soil during the pulling operation so that the pipe can move freely through the earth; and (6) which has a locking grip which holds the pipe while it is pulled. The present invention addresses all six requirements by using a tapered, threaded, expandable internal gripper having an external protective cover.

SUMMARY OF THE INVENTION

The primary object of the present invention is to provide a pipe puller which easily attaches to the pipe to be pulled.

Another object of the present invention is to provide a pipe puller which easily detaches from the pulled pipe.

Another object of the present invention is to provide a pipe puller which protects both the inside and the outside of the pipe from damage during pulling.

Another object of the present invention is to provide a pipe puller which allows the pushing as well as the pulling of the pipe.

Another object of the present invention is to provide a pipe puller that facilitates moving the soil and materials aside during the pulling operation.

Another object of the present invention is to provide a pipe puller which is durable for a long service life.

Another object of the present invention is to provide a pipe puller which is compatible with existing pullers and motive devices.

Another object of the present invention is to provide a pipe puller consisting of stainless steel to prevent corrosion.

Another object of the present invention is to be infinitely adjustable to accommodate variances in pipe inside diameters and wall thicknesses.

Another object of the present invention is to provide a pipe puller which is easily maintained.

Another object of the present invention is to provide a pipe puller consisting of few parts.

Other objects of this invention will appear from the following description and appended claims, reference being had to the accompanying drawings forming a part of this specification wherein like reference characters designate corresponding parts in the several views.

The present invention consists of a gripper slidingly mounted on a shaft. The gripper is tapered to narrow at the end opposite the direction of pull. The taper allows it to function in pipes of various inside diameters and thicknesses. The shaft is tapered in the opposite direction of the gripper. The narrow end of the taper of the shaft is toward the direction of pull. The pipe puller also has a cylindrical cover which covers the end of the pipe to be pulled. The shaft and gripper are inserted into the end of the pipe to be pulled. The cover is then slipped over the outside of the pipe and gripper. The cover has pins which link to the gripper in the pipe. The shaft is pulled by the user to snug the shaft to the gripper and to initially seat the gripper against the inner surface of the pipe. The cover is then turned clockwise when viewed from the end of the pipe. This causes the gripper to turn inside the pipe. This also causes the gripper to expand by sliding on the tapered surface of the shaft. The net effect of these motions is to cause the gripper to expand thereby firmly gripping the pipe between the gripper and the cover.

The pipe is then ready to be pulled by a tractor having a ripping tooth which attaches to the shaft. After the pipe is pulled, the gripper is readily removed from inside the pipe by turning the cover counterclockwise. The user then pushes the shaft in the direction opposite the direction of pull which releases the gripper from the inner surface of the pipe. The puller is then extracted from the pipe.

BRIEF DESCRIPTION OF THE DRAWINGS

FIG. 1 (Prior Art) is a side perspective view depicting a motive device having a chinese finger and ripper pulling a pipe.

FIG. 2 is an exploded side perspective view depicting the essential operational parts of the invention.

FIG. 3 is a side cross-sectional view of the invention shown in FIG. 2 and its relation to the pipe when in use.

FIG. 5 is a side cross-sectional view of the invention shown in FIG. 2 depicting the gripping members contracting movement within the pipe.

FIG. 8 is a side cross-sectional view of the preferred embodiment depicting the pipe in relation to the invention during use of the invention.

Figure 4:
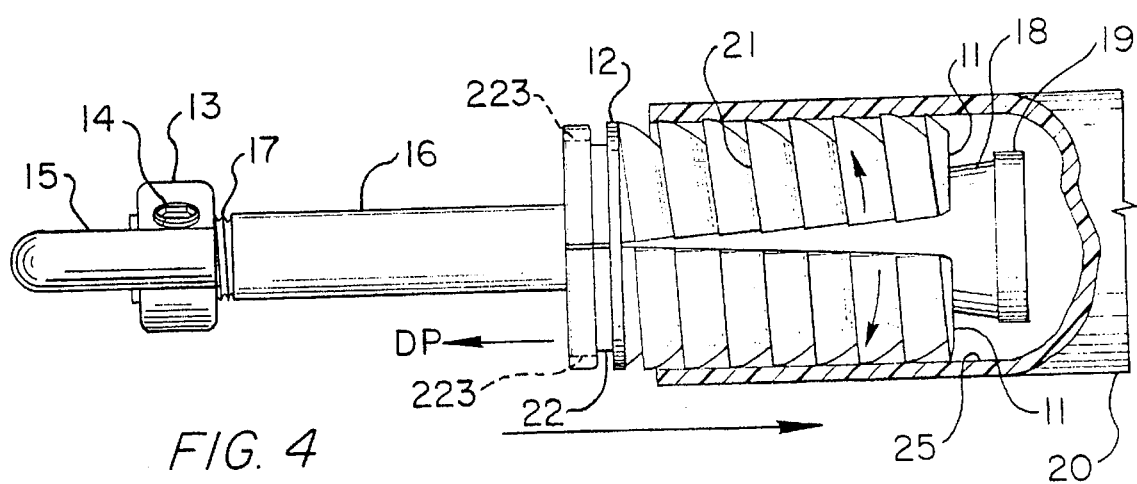
FIG. 4 is a side cross-sectional view of the invention shown in FIG. 2 depicting the gripping members expanding movement within the pipe.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Referring first to FIG. 2 an exploded side view depicts the component parts of the alternate embodiment 10. This embodiment has the minimal parts required to practice the invention. This figure depicts the essential component parts in a lineally exploded fashion.

In FIG. 3 the pipe puller 10 is shown to consist of a shaft 16 inserted through the central hole 23 defined by the gripping members 11. A nut 13 with set screw 14 is threadably attached to the threaded end 17 of the shaft 16. Set screw 14 is tightened upon threaded end 17 once the nut 13 is threaded upon the threaded end 17 of the shaft 16. A chain 15 is attached to the nut 13 providing the means by which the pipe puller 10 is pulled through the earth. The gripping members 11 are held adjacently about the shaft 16 by a snap ring 12. The snap ring 12 is located in a circumferential groove 22 in the assembled gripping members 11. The snap ring 12 holds the gripping members 11 in place adjacently about the shaft 16 when the pipe puller 10 is not in use. The gripping members 11 also have a plurality of locking pin slots 223 into which the locking pins 221 from cover 30 are inserted.

To use the pipe puller 10, it is inserted into one end of the pipe 20 to be pulled. The shaft 16 is then pushed into the pipe 20 as shown in FIG. 3. The gripping members 11 are held within the pipe by the user (not shown) until the tapered surface 18 contacts the narrow end of the gripping members 11. Any means to twist the gripping members 11 may be employed to bite into the inner surface 25 of the pipe 20. These means may include a key (not shown) or a manual turning of the gripping members 11.

As shown in FIG. 4 the user then pulls on the shaft 16 in the direction of pull DP until the spiral ridges 21 of the gripping members 11 are firmly set against the inner surface 25 of the pipe 20. The gripping members 11 have expanded in direction E. The spiral ridges 21 must be firmly set in a manner so as to cause sufficient friction to be developed so as to prevent the pipe puller 10 from sliding out of the pipe 20. Once the spiral ridges 21 of the gripping members 11 are firmly set against the inner surface 25 of the pipe 20, the chain 15 is attached to the motive device (not shown). The pulling procedure is then executed.

Referring next to FIG. 5 the detachment procedure is shown to have begun. The gripping members 11 are shown contracting by arrows C once the pulling of the pipe 20 is completed. The shaft 16 is pushed in the direction opposite of the direction pulled AP. This causes the narrow end 110 of the gripping members 11 to contract by sliding on the shaft 16 to the narrow end 180 of the tapered surface 18 The pipe puller 10 is then turned counterclockwise and removed from the end of the pipe 20 by simply pulling the shaft 16 in the direction of pulling DP.

Figure 6:
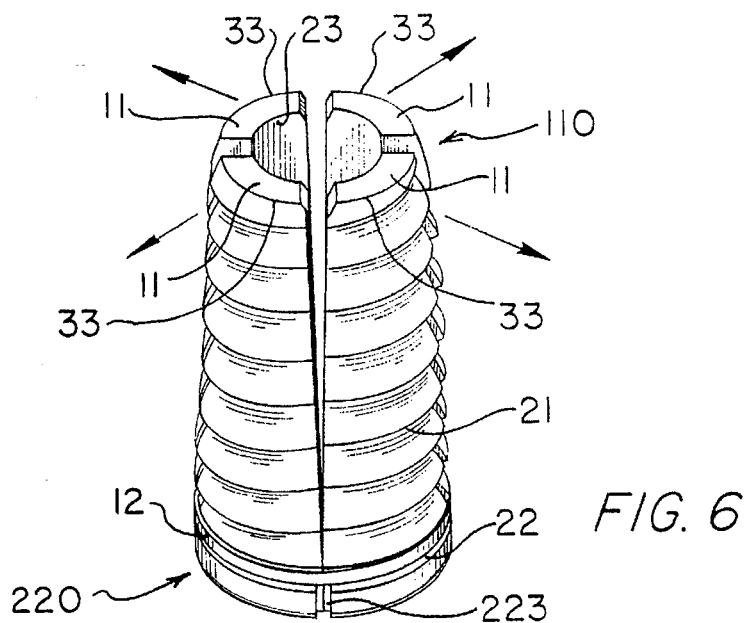
FIG. 6 is an oblique front centerline, perspective view of the gripping member.

Referring next to FIG. 6 the gripping members 11 consist of a plurality of identical members adjacently assembled on the pipe puller 10 to surround the shaft 16. The assembled gripping members 11 have spiral ridges 21 circumferentially cut in the length on the outer surface 33 of the gripping members 11o The gripping members 11 also have a plurality of locking pin slots 223 in the wide end 220 of the gripping members 11 for receiving the locking pins 221. The assembled gripping members 11 also describe a central hole 23 in which the shaft 16 is installed. The gripping members 11 are held in place about the shaft 16 by a snap ring 12. The snap ring 12 is located in a circumferential groove 22 cut in the wide end 220 of the gripping members 11.

Figure 7:
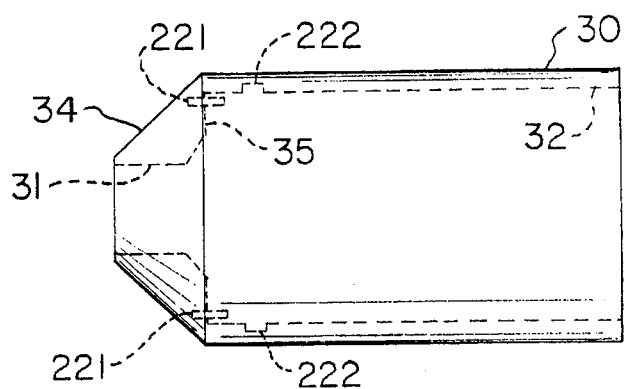
FIG. 7 is a side cross-sectional view of the cover which is used in the preferred embodiment shown in FIG. 8.

Referring next to FIG. 7 the preferred embodiment of the present invention requires a cover 30 having a cover inner surface 32 and a cover small diameter hole 31. The cover small diameter hole 31 is centrally located within the cover shoulder 34. The cover shoulder inner surface 35 supports the wide end 220 of the gripping members 11. The cover shoulder inner surface 35 has a plurality of locking pins 221 installed normally to the surface. The cover inner surface 32 has a snap ring groove 222 located in such a manner so as to be opposite the circumferential groove 22 when the gripping members 11 are seated against the cover shoulder inner surface 35.

The cover 30 has three functions. First it protects the pipe 20 from scratches during pulling. Second it prevents the over-expansion of the gripping members 11 from damaging the pipe 20. Third the cover shoulder 34 acts as a bullet helping to compact the soil during pulling.

Referring next to FIG. 8 the pipe puller 10 is inserted into the pipe 20. This is the preferred embodiment of the invention shown in use. To use the pipe puller 10 the shaft 16 is pulled by the motive device (not shown) in the direction of the pull DP. The gripping members 11 are held within the pipe 20 by their expansion and by interaction with the inner surface 25 of the pipe 20. The gripping members 11 sandwich the pipe 20 against the cover 30. This prevents the gripping members 11 from over-expanding the pipe 20 while the shaft 16 is being pulled. The shaft 16 is pulled until the spiral ridges 21 of the gripping members 11 are firmly set against the inner surface 25 of the pipe 20. Once the spiral ridges 21 of the gripping members 11 are firmly set against the inner surface 25 of the pipe 20, the chain 15 is attached to the motive device (not shown).

To remove the pipe puller 10 from the pipe 20, the user pushes the shaft 16 in the direction opposite of the pull to contract the expandable gripping members 11. The user then turns the cover 30 counterclockwise until the gripping members 11 release from the inside of the pipe 20. User then simply pulls the pipe puller 10 from the pipe 20.

Although the present invention has been described with reference to preferred embodiments, numerous modifications and variations can be made and still the result will come within the scope of the invention. No limitation with respect to the specific embodiments disclosed herein is intended or should be inferred.

KEY

10. Pipe puller
11. Gripping members
12. Snap ring
13. Nut
14. Set screw
15. Chain
16. Shaft
17. Threaded end of shaft 16
18. Tapered surface of shaft 16
20. Pipe
21. Spiral ridges
22. Circumferential groove
23. Central hole 25. Inner surface pipe
30. Cover
31. Cover small diameter hole
32. Cover inner surface
33. Outer surface of the gripping members 11
34. Cover shoulder
35. Cover shoulder inner surface
110. Narrow end of the gripping members 11
180. Narrow end of the tapered surface 18
220. Wide end of the gripping members 11
221. Locking pins
222. Snap ring groove in cover 30
223. Locking pin 221 slot in gripping members 11

I claim:

1. A pipe puller comprising:

a shaft having a first end facing a direction of pull and a second end;

said first end of said shaft having a connecting means for receiving a connector from a pulling device;

said second end of said shaft having a tapered outer surface emanating from a point medial to said shaft to a larger diameter at said second end;

an expandable gripping member having a tapered outer surface with a narrow first end and a wide second end;

said narrow first end of said expandable gripping member having an orientation around said shaft toward said second end of said shaft, whereby said expandable gripping member expandingly slides upon said outer surface of said second end of said shaft upon a pull on the first end of said shaft in the direction of pull;

said outer surface of said expandable gripping member further comprises spiraled ridges functioning to grip an inner surface of a pipe under an expansion of said expandable gripping member and functioning to release the pipe after expansion;

a hollow cylinder having an inner surface, said inner surface forming a space between the tapered outer surface and itself functioning to clasp the pipe, said hollow cylinder slidingly mounted to said shaft and having a first end and a second end;

said first end of said hollow cylinder having a diameter greater than the diameter of said second end of said expandable gripping member; and said second end of said hollow cylinder having a shoulder facing in the direction of pull, said shoulder having an inner surface and further defining a hole, whereby said hollow cylinder is slidably mounted to said shaft.

2. The pipe puller of claim 1, wherein said hollow cylinder further comprises a linkage means functioning to join said hollow cylinder to said gripping member thereby allowing a user to rotate said gripping member within a pipe.

3. The pipe puller of claim 2, wherein the expandable gripping member further comprises a plurality of circumferentially adjacent members.

4. The pipe puller of claim 2 wherein said linkage means further comprises a pin attached to the inner surface of said hollow cylinder wherein said pin is parallel to said shaft.

5. A pipe puller for gripping an inside of a pipe to be pulled in a direction of pull, said pipe puller comprising:

a shaft having a first end connected to a puller; said shaft having a second wide end having a taper toward the puller;

a tapered gripper slidably mounted around said shaft whereby the tapered gripper expands into an inside of a pipe when the puller pulls the pipe in a direction of pull; and a cylindrical cover having an inner surface, said inner surface forming a space between the tapered outer surface and itself functioning to clasp the pipe, said cylindrical cover slidingly mounted around said shaft and having a shoulder facing in the direction of pull.

6. The pipe puller of claim 5, wherein said tapered gripper further comprises a plurality of circumferentially adjacent members.

7. The pipe puller of claim 5, wherein said cylindrical cover further comprises a linkage means functioning to join said cylindrical cover to said gripping member thereby allowing a user to rotate said gripping member within a pipe.

8. The pipe puller of claim 7, wherein said linkage means further comprises a pin attached to the inner surface of said shoulder, wherein said pin is parallel to said shaft.

9. A pipe puller for gripping an inside of a pipe, said pipe puller comprising:

a shaft having a first end and a second end;

said first end of said shaft having a taper toward said second end;

said second end having a means to attach to a pulling device;

an expandable tapered gripper having a spiral ridge and comprising a plurality of adjacent members slidably mounted around said shaft;

said expandable tapered gripper having a narrow end, said narrow end being adjacent to said first end of said shaft;

a cover having an inner surface, said inner surface forming a space between the tapered outer surface and itself functioning to clasp the pipe, which cover is slidably mounted on said shaft whereby said cover encloses said tapered gripper;

said cover having a first end and a second end;

said first end describing a hole of slightly greater diameter than said shaft; and said second end describing a hole of greater diameter than said expandable tapered gripper.

10. The pipe puller of claim 9, wherein said cover further comprises a linkage means functioning to join said cover to said gripping members thereby allowing a user to rotate said gripping members within a pipe.

11. The pipe puller of claim 10, wherein said linkage means further comprises a pin attached to the inner surface of said cover wherein said pin is parallel to said shaft.

* * * * *